US010565057B2

(12) United States Patent
Singhai et al.

(10) Patent No.: US 10,565,057 B2
(45) Date of Patent: Feb. 18, 2020

(54) INDIRECTION-BASED STORAGE SYSTEM BACKUPS USING MARKERS INCLUDING SETS OF SERIAL NUMBERS ASSOCIATED WITH SEGMENTS

(71) Applicant: Western Digital Technologies, Inc., San Jose, CA (US)

(72) Inventors: Ashish Singhai, Los Altos, CA (US); Vijay Karamcheti, Los Altos Hills, CA (US); Ashwin Narasimha, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 207 days.

(21) Appl. No.: 15/587,403

(22) Filed: May 5, 2017

(65) Prior Publication Data
US 2018/0024759 A1   Jan. 25, 2018

Related U.S. Application Data

(60) Provisional application No. 62/364,304, filed on Jul. 19, 2016.

(51) Int. Cl.
*G06F 3/06* (2006.01)
*G06F 11/14* (2006.01)
*G06F 12/02* (2006.01)

(52) U.S. Cl.
CPC .......... *G06F 11/1446* (2013.01); *G06F 3/065* (2013.01); *G06F 3/067* (2013.01);
(Continued)

(58) Field of Classification Search
CPC .... G06F 11/1446; G06F 3/0619; G06F 3/065; G06F 3/067; G06F 11/1448; G06F 11/1451; G06F 12/0253; G06F 12/0269
See application file for complete search history.

(56) References Cited

U.S. PATENT DOCUMENTS 7,143,251 B1 * 11/2006 Patterson ............ G06F 16/1744
                                                        711/162
7,266,574 B1    9/2007 Boudrie et al.
(Continued)

*Primary Examiner* — Glenn Gossage
(74) *Attorney, Agent, or Firm* — Patent Law Works LLP

(57) ABSTRACT

A data storage system comprises, a storage device having segments that are configured to store data, and storage logic coupled to the storage device that manages storage of data on the storage device using a translation table. The storage logic is executable to receive a first marker as part of a backup request, generate a second marker encapsulating a state of the storage device at a second time, calculate a difference between the first marker and the second marker, and generate a backup of data stored in the storage device based on the calculated difference between the first marker and the second marker. A garbage collection (GC) barrier may be set based on serial numbers associated with backup segments, and the garbage collection barrier may be incrementally released by releasing the garbage collection barrier for each segment after the segment has been backed up. The storage logic may also record the deletion of a storage unit from the storage device in a deletion table, and retire deleted storage mappings in the deletion table responsive to generating the backup.

20 Claims, 12 Drawing Sheets

(52) U.S. Cl.
CPC ........ *G06F 3/0619* (2013.01); *G06F 11/1448* (2013.01); *G06F 11/1451* (2013.01); *G06F 12/0253* (2013.01); *G06F 12/0269* (2013.01)

(56) References Cited

U.S. PATENT DOCUMENTS

| | | |
|---|---|---|
| 7,284,019 B2 | 10/2007 | Adkins et al. |
| 7,831,789 B1 | 11/2010 | Per et al. |
| 8,135,676 B1 | 3/2012 | Poojary et al. |
| 8,176,272 B2 | 5/2012 | Augenstein et al. |
| 8,527,558 B2 | 9/2013 | King et al. |
| 8,918,606 B1 | 12/2014 | Stringham |
| 8,990,162 B1 | 3/2015 | Kushwah et al. |
| 2005/0132250 A1* | 6/2005 | Hansen ............... G06F 11/2097 714/5.11 |
| 2010/0114998 A1* | 5/2010 | Steensgaard ........ G06F 12/0269 707/813 |
| 2010/0180090 A1* | 7/2010 | Click, Jr. ............ G06F 12/0269 711/159 |
| 2011/0196840 A1 | 8/2011 | Barzilai et al. |
| 2015/0178164 A1* | 6/2015 | Zhang ................ G06F 11/1435 714/20 |
| 2018/0004437 A1* | 1/2018 | Battaje ................ G06F 3/0619 |
| 2018/0004652 A1* | 1/2018 | Battaje ................ G06F 12/0246 |

\* cited by examiner

INDIRECTION-BASED STORAGE SYSTEM BACKUPS USING MARKERS INCLUDING SETS OF SERIAL NUMBERS ASSOCIATED WITH SEGMENTS

CROSS REFERENCE TO RELATED APPLICATIONS

The present application claims priority, under 35 U.S.C. § 119, of U.S. Provisional Patent Application No. 62/364,304, filed Jul. 19, 2016 and entitled "Efficient Backups in Indirection Based Storage," which is incorporated herein by reference in its entirety.

BACKGROUND

The present disclosure relates to backing up data stored in a storage system.

Data in computer storage systems is often copied or archived in one or more backups. Backups may include a full backup and a delta backup. A full backup replicates the entire data set, whereas a delta backup replicates data changed since a previous back up. Delta backups can include a differential backup or an incremental backup. A differential backup replicates data that has changed since the previous full backup, where an incremental backup replicates data that has changed since the previous delta backup.

In creating delta backups, a method is usually employed to determine the change set since the previous backup (e.g. previous full or delta backup). Some methods include comparing a per block checksum with a previously remembered checksum for the same block. In file-based systems, file timestamps may be compared to determine which files have changed.

With delta backups, the change set since the previous backup usually needs to be determined. In general, various methods to determine the change set generally trade off time and space. Specifically, the efficiency of the backup process may be sacrificed in order to limit the size of the backup. Conversely, more data than necessary may be backed up in order to limit the resource usage of the backup process.

Many indirection-based storage device systems use a map, such as a dynamic translation table, that keeps track of mappings from logical addresses to physical media. For instance, when logical segments are overwritten, the translation table is updated to point to a new location in the physical media and the old physical media location is reclaimed by a garbage collection process.

SUMMARY

The present disclosure provides innovative aspects for backing up data stored in a storage system. According to one innovative aspect of the subject matter in this disclosure, a storage system includes a storage device having segments that are configured to store data, and storage logic coupled to the storage device that manages storage of data on the storage device using a translation table. The storage logic is configured to receive a first marker as part of a backup request, generate a second marker encapsulating a state of the storage device at a second time, calculate a difference between the first marker and the second marker, and generate a backup of data stored in the storage device based on the calculated difference between the first marker and the second marker. The first marker encapsulates a state of the storage device at a first time. The first marker includes a first set of serial numbers. The first set of serial numbers is associated with a first set of segments. The first marker is based on the translation table at the first time. The second marker includes a second set of serial numbers. The second set of serial numbers is associated with a second set of segments. The second marker is based on the translation table at the second time.

In general, another innovative aspect of the subject matter described in this disclosure may be implemented in methods that include: receiving a first marker as part of a backup request, the first marker encapsulating a state of a storage device at a first time. The first marker includes a first set of serial numbers. The first set of serial numbers is associated with a first set of segments. The first marker is based on a translation table of a storage logic associated with the storage device at the first time. The method includes generating a second marker encapsulating a state of the storage device at a second time. The second marker includes a second set of serial numbers. The second set of serial numbers is associated with a second set of segments, and the second marker is based on the translation table at the second time. The method further includes calculating a difference between the first marker and the second marker, and generating a backup of data stored in the storage device based on the calculated difference between the first marker and the second marker.

In general, another innovative aspect of the subject matter described in this disclosure may be implemented in a data storage system that includes means for storing data having addressable segments; means for translating logical data storage addresses to physical storage addresses; means for receiving a first marker, the first marker encapsulating a state of the storage device at a first time; means for generating a second marker based on the means for translating logical data storage addresses to physical storage addresses; means for calculating a difference between the first marker and the second marker; and means for generating a backup of data based on the calculated difference between the first marker and the second marker.

Other implementations of one or more of these aspects include corresponding systems, apparatus, and computer programs, and other aspects, such as those configured to perform the actions of the methods, encoded on computer storage devices.

These and other implementations may each optionally include one or more of the following features: determining a set of backup segments based on the calculated difference; setting a garbage collection barrier based on the serial numbers associated with the backup segments; incrementally releasing the garbage collection barrier in association with the backup; that the storage logic incrementally releases the garbage collection barrier by releasing the garbage collection barrier for each segment of the set of backup segments after the segment has been backed up; that the storage logic is further configured to generate serial numbers including the first set of serial numbers and the second set of serial numbers; that the storage logic is further configured to generate the first marker based on the translation table at the first time; that generating the second marker includes utilizing the translation table that translates logical addresses to physical addresses in the storage device to capture the second set of serial numbers associated with the second set of segments; that the storage logic is further configured to determine a deletion of a storage unit from the storage device, and record the deletion of the storage unit from the storage device in a deletion table; that generating the backup is further based on the deletion table; that the storage logic is further configured to retire deleted storage unit mappings in the deletion table responsive to generating the backup; that the storage logic is further configured to calculate the difference between the first marker and the second marker by determining a first serial number having a first value, determining a second serial number having a second value that is different from the first value, and enumerating serial numbers between the first serial number and the second serial number; that the first marker includes a first set of offsets and the second marker includes a second set of offsets, and that generating the backup includes backing up segments referenced in the first marker, from the offsets of the first set of offsets to an end of the segments referenced in the first marker, backing up segments with serial number references occurring between the first serial number and the second serial number, and backing up segments referenced in the second marker, from a beginning of the segments to an end of the offsets of the second set of offsets; that the first marker is initialized as an empty set; that generating the second marker includes initializing the second marker, querying the translation table for a set of segments being filled, and adding an index, a serial number, and a fill offset of each of the segments being filled to the second marker.

These implementations are particularly advantageous in a number of respects. For instance, the technology described herein provides efficient incremental backups by consuming fewer computing resources. Further, the technology creates less disruption during a backup procedure. For example, the technology may consume less processor and memory overhead in determining what needs to be backed up in a delta backup as compared to traditional backup approaches. Moreover, users of a computer whose storage is getting backed up may not have to cease functional use of the computer while the backup is performed. It should be understood that the foregoing advantages are provided by way of example and that the technology may have numerous further advantages and benefits.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Data stored in storage systems are often backed up by creating an independent copy. There are many reasons for creating a backup. For example, one reason for creating a backup is to protect against loss of data. By creating a second copy that is subjected to different failure modes than the original (e.g., different physical location, media technology, or administrative domain), the chance of total data loss is diminished. As another example, costs may be lowered by moving less frequently used data to inexpensive storage (e.g., from disk to tape, or from primary storage to bulk storage).

With delta backups, the change set since the previous backup usually needs to be determined. In general, various methods to determine the change set generally trade off time and space. Specifically, the efficiency of the backup process may be sacrificed in order to limit the size of the backup. Conversely, more data than necessary may be backed up in order to limit the resource usage of the backup process.

Various example embodiments for implementing an indirection-based storage system backup mechanism are described below. The storage system includes storage devices, such as Solid State Disks (SSDs), flash arrays, etc., but it should be understood that the systems and methods can be applied to other architectures and organizations of hardware and other memory devices with similar properties such as Hard Disk Drives (HDDs), namespaces storage systems, object storage systems, etc.

Figure 1:
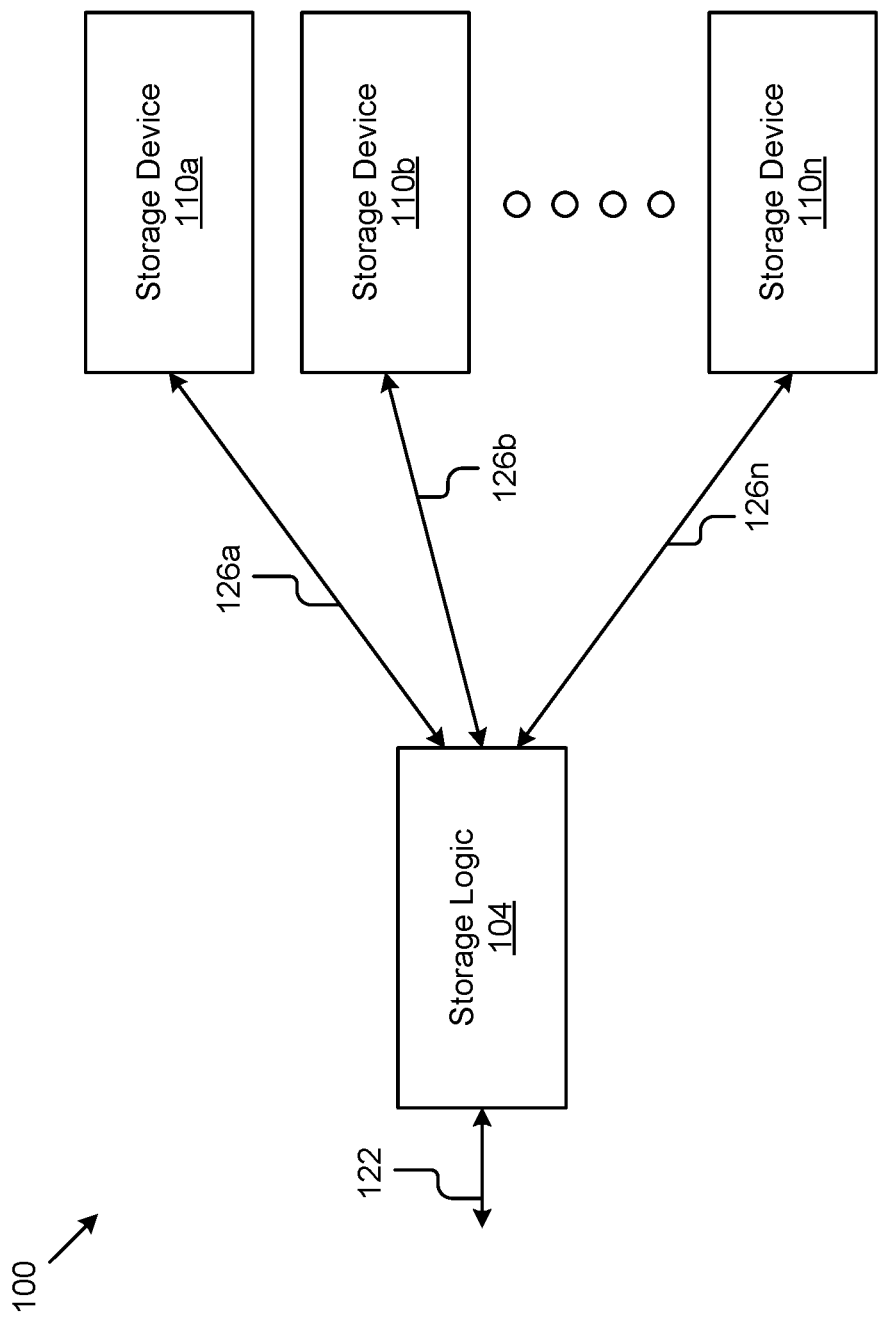
FIG. 1 is a block diagram of an example storage system.

FIG. 1 is a block diagram of an example storage system 100. In the depicted embodiment, the storage system 100 may include storage logic 104, and one or more storage devices 110a, 110b through 110n. It should be noted that the terms "storage media" and "storage device" are used interchangeably throughout the present disclosure to refer to the physical media upon which the data is stored. The storage logic 104 and the one or more storage devices 110a, 110b through 110n are communicatively coupled via signal lines 126a, 126b through 126n. Further, in the illustrated embodiment, the storage logic 104 is further communicatively connected, via signal line 122, to other system 100 elements, such as external systems (not shown). However, the present disclosure is not limited to this configuration and a variety of different system environments and configurations can be deployed and are within the scope of the present disclosure. Other embodiments may include additional or fewer components.

It should be recognized that, in the figures, an indication of a letter after a reference number or numeral, for example, "110a", is a specific reference to the element or component that is designated by that particular reference numeral. In the event a reference numeral appears in the text without a letter following it, for example, "110," it should be recognized that such is a general reference to different embodiments of the element or component bearing that general reference numeral.

In some embodiments, the storage logic 104 implements a backup engine as well as store-related operations in storage devices. The storage logic 104 can provide computing functionalities, services, and/or resources to send, receive, read, write, and transform data from other entities of system 100. In some embodiments, the storage logic 104 can be comprised of hardware and/or software logic, configured to make a portion or all of the storage space available on storage devices 110. The storage logic 104 is coupled to the storage devices 110 via signal lines 126 for communication and cooperation with the storage devices 110 of the storage system 100. In some embodiments, the storage logic 104 transmits data between the storage devices 110a-110n via the signal lines 126a-126n. The storage logic 104 may be further communicatively connected via signal line 122 to other system 100 elements, such as external systems. For example, the signal line 122 may represent a computer bus including a Serial Advanced Technology Attachment (SATA) bus, serial attached SCSI (SAS), peripheral component interconnect (PCI), PCI express (PCIe), or any other suitable type of internal and/or external communication bus for transferring data between components of a computing and/or storage device and/or between components of disparate components. As a further example, the computer bus may be communicatively connected to a host bus of a computer system. It should be recognized that the storage logic block may represent a distributed architecture or otherwise include multiple storage logic 104 elements. For simplicity and ease of understanding, the system configuration and operations performed by the storage system 100 are described in the context of a single storage logic 104.

The storage devices 110a, 110b through 110n, may include a non-transitory computer-usable (e.g., readable, writeable, etc.) medium, which can be any non-transitory apparatus or devices that can contain, store, communicate, propagate or transport instructions, data, computer programs, software, code routines, etc., for processing by or in connection with a processor. In some embodiments, the storage devices 110a, 110b through 110n communicate and cooperate with the storage logic 104 via signal lines 126a, 126b through 126n. While, in various embodiments, the storage devices 110 are described as flash memory, it should be understood that in some embodiments, the storage devices 110 may include other non-volatile memory devices with suitable characteristics.

In some cases, storage logic 104 and the storage device(s) 110 may be integrated into a single storage device. For example, a 2.5 inch SSD may include storage logic 104 along with storage device 110 in a single integrated package with the interface for power and data communication through a SATA interface. Similarly, the storage system 100 may be a single HDD with storage logic 104 and the storage device 110. In this example, the storage device 110 may include one or more hard disk platters. In another example, storage logic 104 may be implemented as a controller, such as a RAID controller, and storage devices 110 may include multiple devices connected to the controller. In a further example, storage system 100 may be a distributed storage system spanning several geographic regions. In this example, storage logic 104 may include an Application Programming Interface (API) implemented on one or more server nodes in the distributed storage system 100. Thus, control line 122 may include a transport protocol operating over Internet Protocol (IP). In such an example, the storage device(s) 110 may include several other server nodes spread across several geographic regions, and control lines 126 may also include a transfer protocol operating over IP.

The techniques described herein may use existing translation structures in storage devices and systems. Thus, overhead may be significantly reduced while still reliably determining the set of data segments changed since the last backup. Moreover, the techniques described herein can easily integrate with operational workflows and limit system downtime. Further, the techniques described herein describe novel approaches to handling the ancillary backup storage system issues including garbage collection and segment deletion.

Regardless of the exact implementation of the storage system 100, some or all of the following terminology characteristics may apply. A unit of space means a portion of space allocated to storing data. In some cases the unit of space may be referred to as a segment. In different implementations, a segment may be called different names. For example in an SSD, a segment may refer to in an erase block or a collection of erase blocks. In an HDD, a segment may be a disk track or collection of adjacent sectors. Segment addresses are physical addresses and segments are generally subjected to garbage collection (GC). Garbage collection is generally a form of automatic data storage management. Garbage collection may periodically attempt to reclaim portions of the storage system occupied by data that is no longer needed (e.g. moved or deleted data). Garbage collection may be employed on contiguous ranges of locations within storage media.

Continuing on, the storage system 100 may include a translation mechanism that stores the association between a logical address (e.g. a logical block address (LBA)) and a physical location (e.g. segment and offset). Each time a new segment is written to the storage system 100, the translation structure may be updated. In some embodiments, when data is written, the segments in storage system 100 may be filled deterministically. As an example, a common method to deterministically fill the storage system includes filling the storage system 100 from a low address to a high address. Thus, a storage device 110 may include multiple segments that are deterministically filled and garbage collected.

Figure 2:
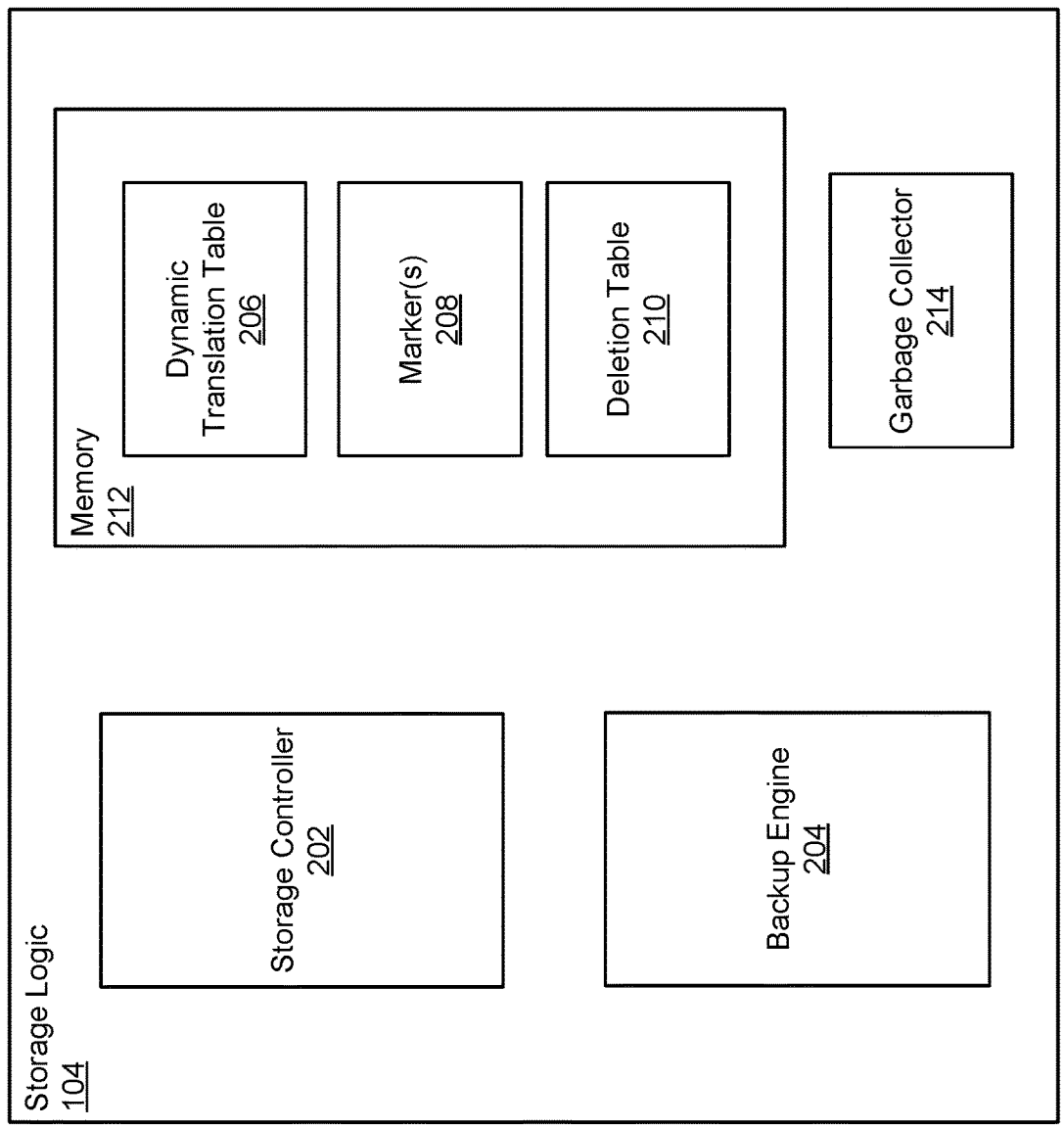
FIG. 2 is a block diagram of example storage logic.

FIG. 2 is a block diagram of example storage logic 104. The storage logic 104 is hardware and/or software logic for implementing the marker-based backups for storage devices 110. As depicted in FIG. 2, the storage logic 104 may include a storage controller 202, a backup engine 204, a memory 212, and a garbage collector 214, which may be electronically communicatively coupled by a communication bus (not shown) for cooperation and communication with each other. The memory 212 may further include a dynamic translation table 206, a marker 208, and a deletion table 210. The components 202, 204, 206, 208, 210, 212, and 214 are also coupled for communication with other entities (e.g., storage devices 110) of the storage system 100 via signal lines 126. However, the present disclosure is not limited to this configuration and a variety of different system environments and configurations can be deployed and are within the scope of the present disclosure. Other embodiments may include additional or fewer components.

In some embodiments, the storage controller 202, the backup engine 204, the memory 212, and the garbage collector 214 are hardware for performing the operations described below. In some embodiments, the storage controller 202, the backup engine 204, and the garbage collector 214 are sets of instructions executable by a processor or logic included in one or more customized processors, to provide their respective functionalities. In some embodiments, the storage controller 202, the backup engine 204, the memory 212, and the garbage collector 214 are stored in a non-transitory storage apparatus and are accessible and executable by a processor to provide their respective functionalities. In further embodiments, the storage controller 202, the backup engine 204, the memory 212, and the garbage collector 214 are adapted for cooperation and communication with a processor and other components of the storage system 100.

The storage controller 202 is hardware and/or software logic for providing efficient data management. The storage controller 202 may be electronically communicatively coupled by a communication bus (not shown) for cooperation and communication with other components of the storage logic 104. In some embodiments, the storage controller 202 is a processor. The storage controller 202 may communicate data from external systems via signal line 122 and other data from memory 212 and storage devices 110. Additionally, the storage controller 202 may perform programmatic operations on the dynamic translation table 206 and the deletion table 210, including updating, deleting, querying, and/or manipulating the dynamic translation table 206 and the deletion table 210.

The backup engine 204 is hardware and/or software logic for initiating backups of the storage devices 110. The backup engine 204 may be electronically communicatively coupled by a communication bus (not shown) for cooperation and communication with other components of the storage logic 104. The backup engine 204 may set a garbage collection barrier based on serial numbers in the marker 208 by instructing the garbage collector 214 to bypass garbage collecting specific segments. A marker is a structure that encapsulates the state of the storage devices 110. The marker captures the segments being filled in a storage device at a particular instance. In some embodiments, the marker 208 may be stored in the memory 212 and retrieved by the storage controller 202 when needed. The backup engine 204 may generate a marker with a set of serial numbers of segments which are actively being filled in the storage system by communicating with the dynamic translation table 206 and/or the storage controller 202. Moreover, the backup engine 204 may calculate a difference between a previous marker and a current marker. For example, a previous marker may be stored in the memory 212 or an external memory (not shown) and communicated to the backup engine 204. The backup engine 204 may then generate a new marker and compare the previous marker to the new marker. Additionally, the backup engine 204 may incrementally release the garbage collection barrier as the backup is generated by communicating segments to release from the garbage collection barrier. The backup engine 204 may read the dynamic translation table 206, and generate data for, and write data to, the marker 208. The backup engine 204 may also read from and/or write to the deletion table. The backup engine 204 is described further in detail with reference to FIG. 3 below.

The dynamic translation table 206 is a table with a translation structure. A translation structure is a data structure that maps a logical address to a physical address. For instance, a translation structure may be implemented as a table with two columns: a logical address column and a physical address column, and rows for logical addresses associated with physical addresses. In some embodiments, the dynamic translation table 206 may be stored in the memory 212 and retrieved by the storage controller 202 when needed. In some embodiments, the dynamic translation table 206 may be updated with the data store operations by the storage controller 202 to keep track of the latest translation from logical address to physical address. The storage controller 202 may use the dynamic translation table 206 for writing data blocks to the storage devices 110, erasing data blocks from the storage devices 110, etc.

The memory 212 may store instructions and/or data that may be executed by a customized processor (e.g., the storage controller 202). In the illustrated embodiment, the memory 212 may store a dynamic translation table 206, a marker 208, and a deletion table 210. The memory 212 is coupled to a bus (not shown) for communication with the other components of the storage logic 104. The instructions and/or data stored in the memory 212 may include code for performing the techniques described herein. The memory 212 may be, for example, non-transitory memory, such as a dynamic random access memory (DRAM) device, a static random access memory (SRAM) device, or another volatile memory device.

The garbage collector 214 is hardware and/or software logic for performing garbage collection on the storage devices 110. The garbage collector 214 performs data garbage collection periodically on the storage devices 110 of the storage system 100. The garbage collector 214 may be electronically communicatively coupled by a communication bus (not shown) for cooperation and communication with other components of the storage logic 104. The garbage collector 214 is discussed in further detail with reference to the garbage collection barrier component 306 below in FIG. 3.

Figure 3:
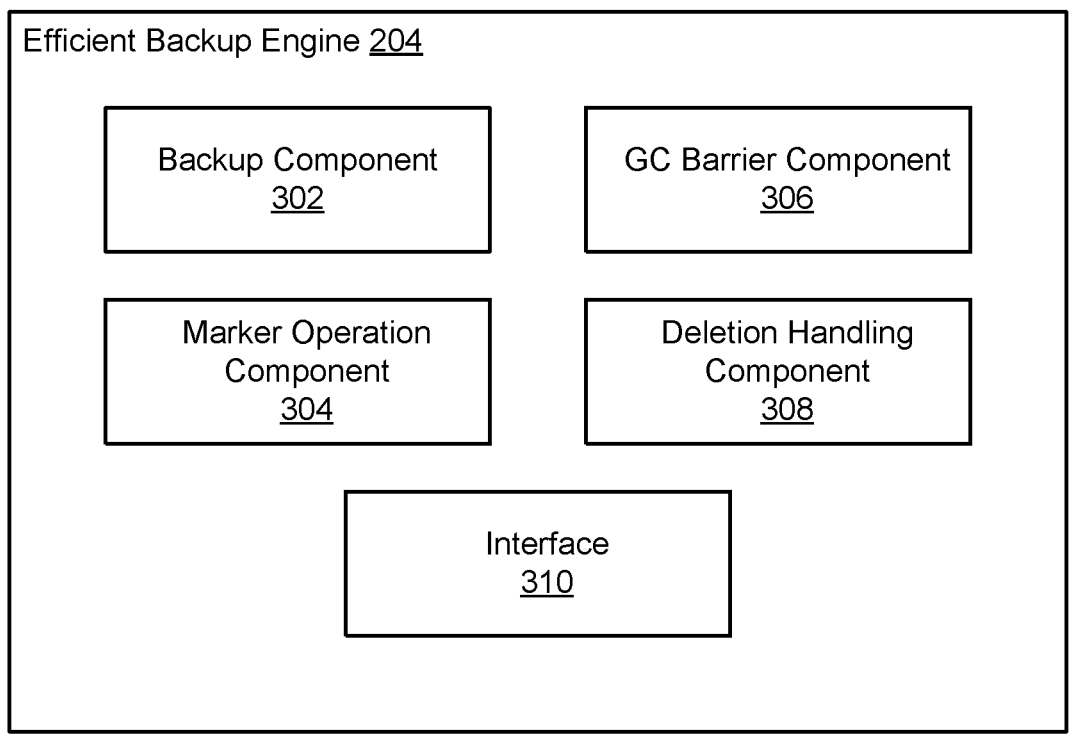
FIG. 3 is a block diagram of an example backup engine.

FIG. 3 is a block diagram of an example backup engine 204. The backup engine 204 is hardware and/or software logic for performing backups of the storage devices 110. As depicted in FIG. 3, the backup engine 204 may include a backup component 302, a marker operation component 304, a garbage collection (GC) barrier component 306, a deletion handling component 308, and an interface 310, which may be electronically communicatively coupled by a communication bus (not shown) for cooperation and communication with each other. The components 302, 304, 306, 308, and 310 are also coupled for communication with other entities (e.g., 202, 204, 206, 208, 210, 212, 214, etc. not shown) of the storage system 100. However, the present disclosure is not limited to this configuration and a variety of different system environments and configurations can be deployed and are within the scope of the present disclosure. Other embodiments may include additional or fewer components.

The backup component 302 is hardware and/or software logic for coordinating a backup and outputting data to a backup storage device. The backup component 302 may be electronically communicatively coupled by a communication bus (not shown) for cooperation and communication with other components of the backup engine 204. The backup component 302 may receive a backup request via the interface 310. The interface may provide a previous marker to indicate the type of backup to perform (e.g. full or incremental). Alternatively, the backup component may retrieve a previous marker from the markers 208 in the memory 212. The backup component 302 may communicate with the garbage collection barrier component 306 to set a garbage collection barrier based on serial numbers and the previous marker. The backup component 302 may also communicate with the marker operation component 304 to request generation of a new marker and to perform various marker operations including calculating the difference between the previous marker and the new marker. The backup component 302 may communicate with deletion handling component 308 to determine which segments to include and not include in a backup. Further, backup component 302 may communicate with deletion handling component 308 instructing the deletion handling component 308 to update the deletion table 210 based on the performed backup.

The marker operation component 304 is hardware and/or software logic for updating and using the markers 208. The marker operation component 304 may be electronically communicatively coupled by a communication bus (not shown) for cooperation and communication with other components of the backup engine 204. The marker operation component 304 may generate a marker by allocating space in the markers 208 for the particular marker and initializing the marker as an empty set. Marker operation component 304 may communicate with the dynamic translation table 206 and/or the storage controller 202 to receive a list of all active segments currently being filled in the storage devices 110. The list of active segments currently being filled may then be added to the initially empty set to generate the new marker. The marker operation component 304 may also calculate a marker difference. The marker operation component 304 may also communicate with the garbage collection barrier component 306 to set and release garbage collection barriers on segments in the storage devices 110.

The storage system 100 may maintain a serial number. For example the serial number may be maintained in the memory 212. The serial number may be initialized at zero when the storage system is first put into use. Segments are assigned a serial number when they are placed into service. For example when a segment starts to fill (i.e. data begins to be stored in the segment), the assigned serial numbers are persistently recorded in the storage system 100. For example, the assigned serial numbers may be stored in the memory 212. The serial numbers are assigned to segments deterministically. For example, if garbage collection moves data from segments bearing the serial numbers s1, s2, s3, and s4 into the segment (e.g. an erase block), the segment's serial number would be the minimum of s1, s2, s3, and s4.

Generally the range of serial numbers is the maximum reuse per segment count times the number of segments in the system. As an illustrative example, a system with 2 terabytes (TBs) of raw capacity and an 8 megabyte (MB) segment size may have about 256,000 segments. If the maximum reuse per segment count is around 32,000, the range of serial numbers is between 1 and 32,000 times 256,000, or around about 8 million. In such an embodiment, a 32-bit integer should be large enough to store any potential serial number.

A marker includes the set of serial numbers of the segments being filled at a particular instant with non-garbage collected data. Additionally, the marker includes the offset within each segment indicating the point in the segment to which the segment is filled. Generally, the number of segments that can be written in some storage systems is limited. Thus, the size of the marker data structure may be relatively limited. In some cases, the size of the marker may only need a few hundred bytes. Since capturing the current state of the segments being filled can be done relatively quickly, marker generation may be both time and space efficient. In some implementations, capturing the current state of the segments may be performed by querying the dynamic translation table 206. A marker comprising all zeros may generally represent a time immemorial in a storage device's life, or in other words the start of a storage device's life at format time.

The garbage collection barrier component 306 is hardware and/or software logic for limiting garbage collection of specified segments at particular moments. The garbage collection barrier component 306 may be electronically communicatively coupled by a communication bus (not shown) for cooperation and communication with other components of the backup engine 204. The garbage collection barrier component 306 may communicate with the backup component 302 and the marker operation component 304 and receive segments to block or allow garbage collection on specified segments. The garbage collection barrier component 306 may communicate with the garbage collector 214 instructing the garbage collector 214 to avoid garbage collection on specified segments.

The deletion handling component 308 is hardware and/or software logic for managing issues arising in backups with deletions made in the storage devices 110. The deletion handling component 308 may be electronically communicatively coupled by a communication bus (not shown) for cooperation and communication with other components of the backup engine 204. The deletion handling component 308 may communicate with interface 310 to determine which segments have been deleted as instructed by the storage controller 202. The deletion handling component 308 may store which segments have been deleted in the deletion table 210. The deletion handling component 308 may further communicate with the backup component 302 to provide a list of segments that have been deleted. Further, the deletion handling component 308 communicates with the backup component 302 to retire entries in the deletion table 210 as the backup is completed. The deletion table 210 may be intrinsically provided in the storage logic 104 to perform other functionalities related to the storage controller 202 and the storage devices 110.

The interface 310 is hardware and/or software logic for interfacing with other components of the storage logic 104, the storage devices 110, and/or other external systems. The interface 310 may be electronically communicatively coupled by a communication bus (not shown) for cooperation and communication with other components of the backup engine 204.

Figure 4:
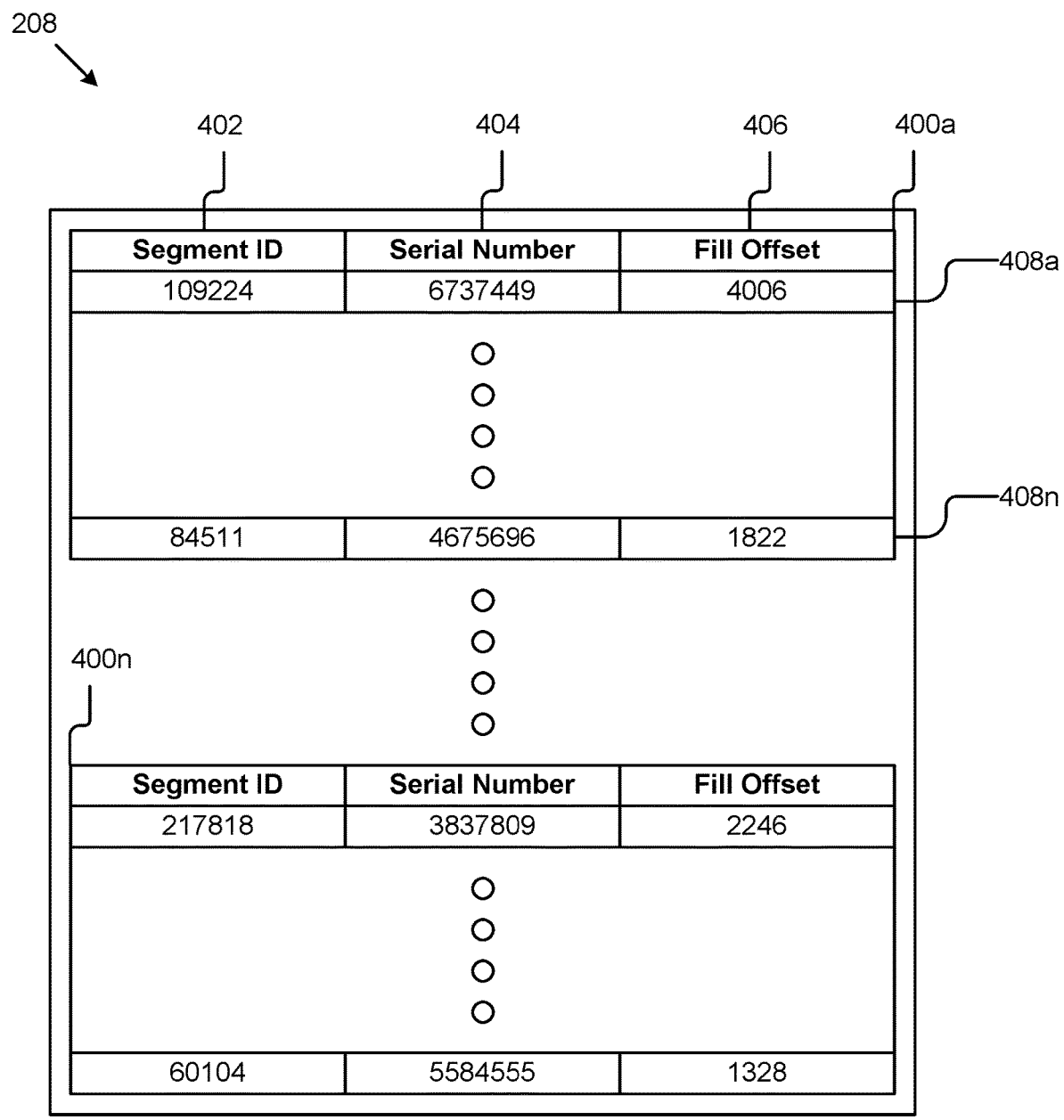
FIG. 4 schematically illustrates example multiple markers backing-up data in an indirection-based storage system.

FIG. 4 schematically illustrates example multiple markers 208 backing up data in an indirection-based storage system. The markers 208 includes multiple markers 400a to 400n. The marker 400 may include multiple records 408a to 408n. The record 408 may include a segment ID 402, a serial number 404, and a fill offset 406.

While the markers 208 and the specific markers 400 are illustrated as tables with rows and columns, other implementations may use different data structures to hold the pertinent information described herein.

With two markers, and the assurance that no segments have been garbage collected since generating the second marker, segments between the moments when these markers were generated can be enumerated.

Figure 5:
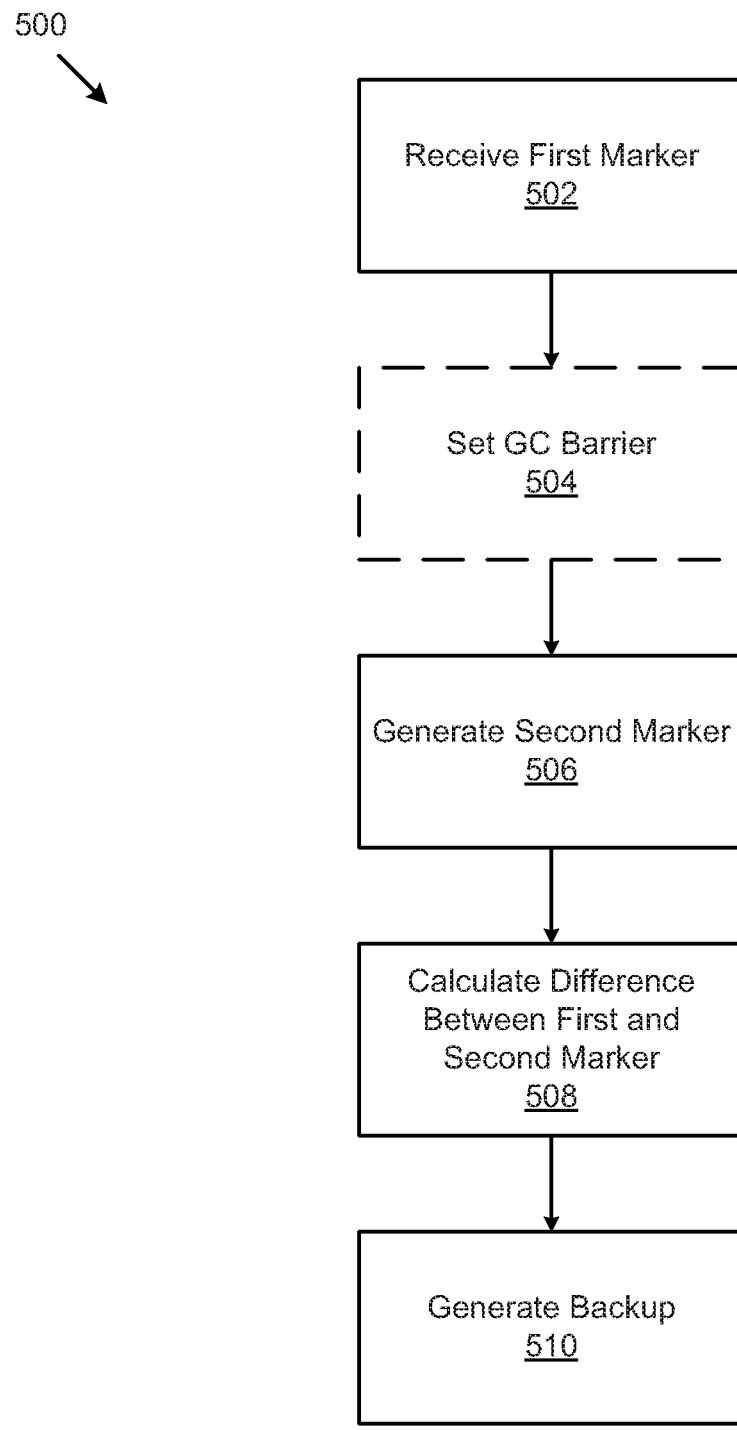
FIG. 5 is a flow chart of an example method for marker-based backup in an indirection-based storage system.

FIG. 5 is a flow chart of an example method 500 for marker-based backup in an indirection-based storage system. The method 500 may begin by receiving, in block 502, a first marker. The first marker may be received as part of a backup request. In one embodiment, the backup component 302 receives the first marker through the interface 310. For example, a system administrator may initiate a backup process by selecting a file containing a previous marker and indicating to a user interface that the system is to be backed up from the point embodied in the previous marker to the current state of the system. The user interface may then communicate with interface 310 to initiate a backup. The first marker may encapsulate a state of the storage device at a first time. The first marker may include a first set of serial numbers and a first set of offsets. The first set of serial numbers and the first set of offsets may be associated with a first set of segments. The first marker may be based on the translation table at the first time.

In block 504, a garbage collection barrier may optionally be set based on the first set of serial numbers in the first marker. In some cases, the first marker may be retrieved by the backup component 302 directly from the markers 208. The backup component 302 may then extract the serial numbers referenced in the first marker and set garbage collection barriers on segments with the extracted serial numbers. For example, the backup component 302 instructs the garbage collection barrier component 306 to avoid garbage collection on the specified segments until further notified.

In block 506, a second marker encapsulating a state of the storage device 110 at a second time may be generated. The backup component 302 may instruct the marker operation component 304 to generate a new marker. The marker operation component 304 may query the dynamic translation table 206 for segments that are actively being filled in the storage devices 110. The segment identifier, the segment serial number, and the segment fill offset are stored in the markers 208. The marker operation component 304 may then communicate with the backup component 302 that the new marker is stored in the markers 208 and in some cases may pass a reference or pointer to the specific marker in the markers 208. The second marker includes a second set of serial numbers and a second set of offsets. The second set of serial numbers and the second set of offsets are associated with a second set of segments. The second marker may be based on the translation table at the second time.

In block 508, the difference between the first marker and the second marker may be calculated. The backup component 302 may pass the first marker and the new marker to the marker operation component 304. For example, the backup component 302 may pass a pair of marker pointers to the markers 208. Each pointer referencing a specific marker, either the first marker or the second new marker. The marker operation component 304 may then calculate the difference between the first marker and second marker and return a set of segments (also called backup segments) that were written to the storage device 110 between the generation of the first marker and the generation of the second marker. In some cases, as discussed above, change set determination may be done at the level of an internal data structure of the system without actually touching any application data. For example, the dynamic translation table 206 may be queried. In some cases, the size of the change set may guide the decision to take an incremental or a full backup. A full backup may, in some cases, be produced by selecting an initial or first marker that is empty with all zeros. The returned new marker may then be saved for future use in a delta backup. With a delta backup, selection of the first marker may determine whether the delta backup is a differential backup or an incremental backup. For a differential backup, the latest available full backup marker may be used as the first marker. For an incremental backup, the latest available incremental backup marker may be used as the first marker.

In block 510, a backup is generated based on the calculated difference between the first marker in the second marker. Again, the backup component 302, responsive to receiving the calculated difference between the first marker and the second marker, may output data in the segments specified by the marker difference to the interface 310. The interface 310 may be communicatively connected to a tape drive or other backup device through the communication line 122. Data stored in the segments specified by the marker difference may be outputted for backup storage. In some embodiments, the garbage collection barrier may also be incrementally released in association with the backup generated in block 510. For example, the garbage collection barrier may be released by releasing the garbage collection barrier for each segment after the segment has been backed up. For instance, the backup component 302 may be connected with the garbage barrier component 306 to incrementally release garbage collection barriers on segments that have been backed up by outputting the data to the interface 310.

Figure 6:
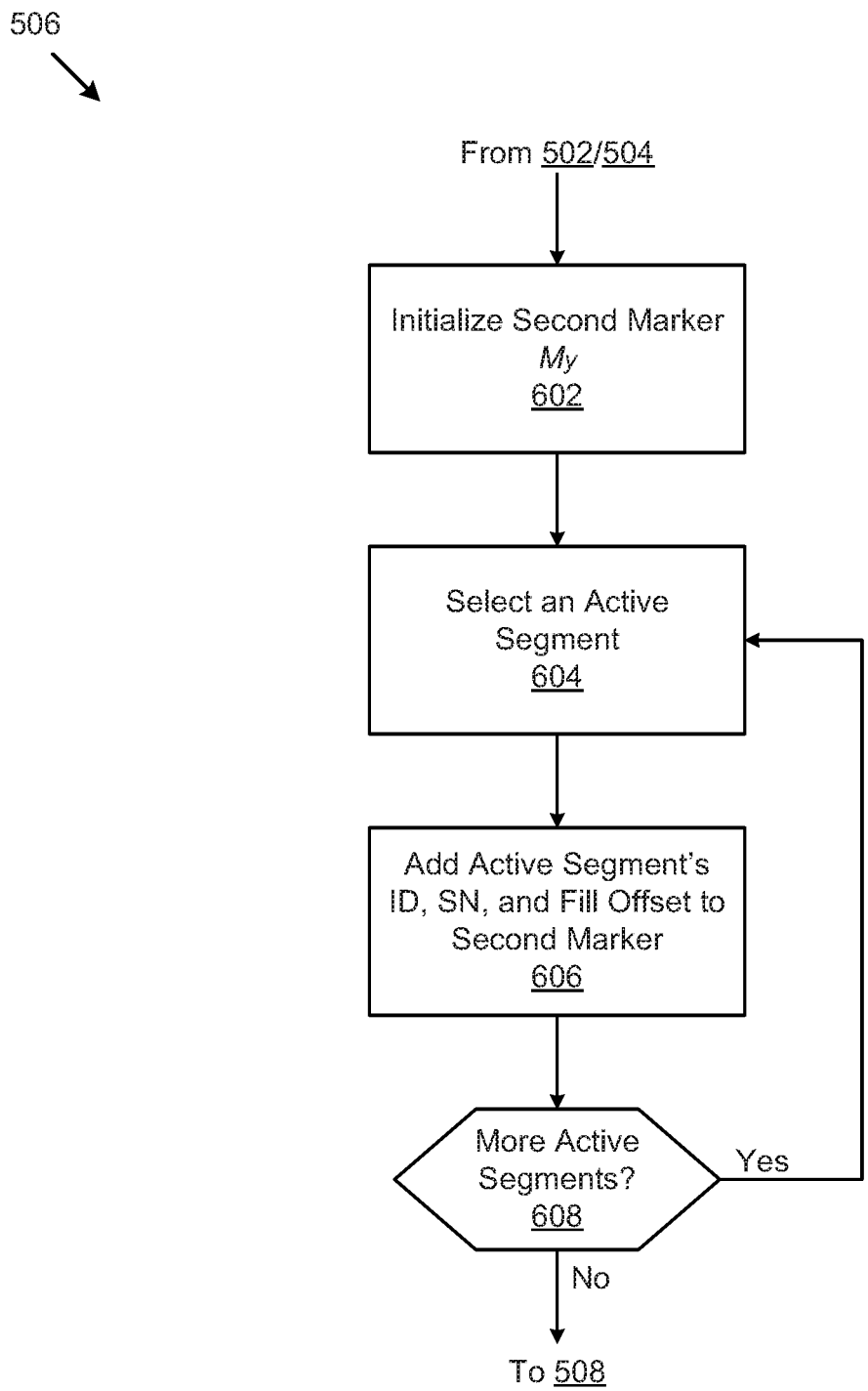
FIG. 6 is a flow chart of an example method of generating a marker.

FIG. 6 is a flow chart of an example method of generating a marker. In particular, the example method illustrated in FIG. 6 shows further details of generating a second marker as shown in block 506 in FIG. 5. More generally, the example method illustrated in FIG. 6 may be used to generate a marker based on the translation table at a particular time. The method corresponding to block 506 may begin by initializing, in block 602, a second marker My through the backup component 302, as discussed above, and requesting a new marker through the marker operation component 304. The marker operation component 304 may initialize the second marker My by allocating space in the markers 208 and overwriting any existing data in the allocated space within the markers 208 with zeros to indicate an empty set. Thus, generating a marker may include utilizing the translation table that translates logical addresses to physical addresses in the storage device to capture the set of serial numbers of the set of segments being filled.

The method may further include selecting, in block 604, an active segment and adding, in block 606, identifier (ID), serial number (SN), and fill offset to the second marker My. For example the marker operation component 304 may query the dynamic transition table 206 for segments actively being filled. For each active segment, the segment ID, the segment SN, and the segment's fill offset may be inserted into a record 408 and in marker 400. In particular, the segment ID may be stored in 402, the serial number may be stored in 404, and the fill offset may be stored in 406, in a single record 408. As shown in decision block 608, each active segment may be similarly added to the marker 400.

Figure 7:
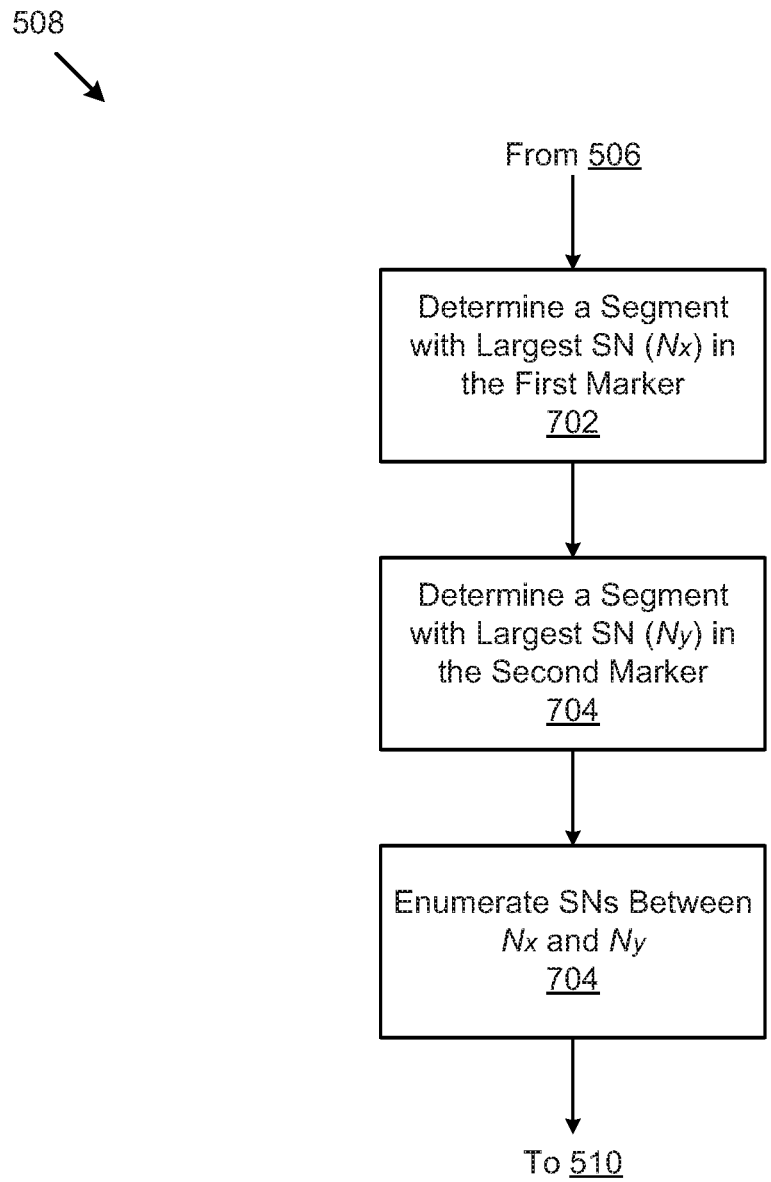
FIG. 7 is a flow chart of an example method of calculating a marker difference.

FIG. 7 is a flow chart of an example method of calculating a marker difference. In particular the example method illustrated in FIG. 7 shows further details of calculating the difference between a first marker and a second marker as shown in block 508 in FIG. 5. The method corresponding to block 508 may begin by determining, in block 702, the segment with the largest serial number Nx in the first marker. For example, with a first marker having the serial numbers 6737449, 3327114, and 465696, it would be determined, in block 702, that the segment with the serial number 6737449 is the segment with the largest serial number. To be clear, the largest serial number Nx in the first marker is set as 6737449.

Similarly, in block 704 the segment with the largest serial number Ny in the second marker is determined. For example, with a second marker having the serial numbers 3837809, 6737463, and 5584555, it would be determined, in block 702, that the segment with the serial number 6737463 is the segment with the largest serial number. To be clear, the largest serial number Ny in the second marker is set as 6737463. Then, in block 704, serial numbers between Nx and Ny are enumerated. For example, the set {6737449, 6737450, 6737451 . . . 6737463} may be returned from the marker operation component 304 to the backup component 302.

Figure 8:
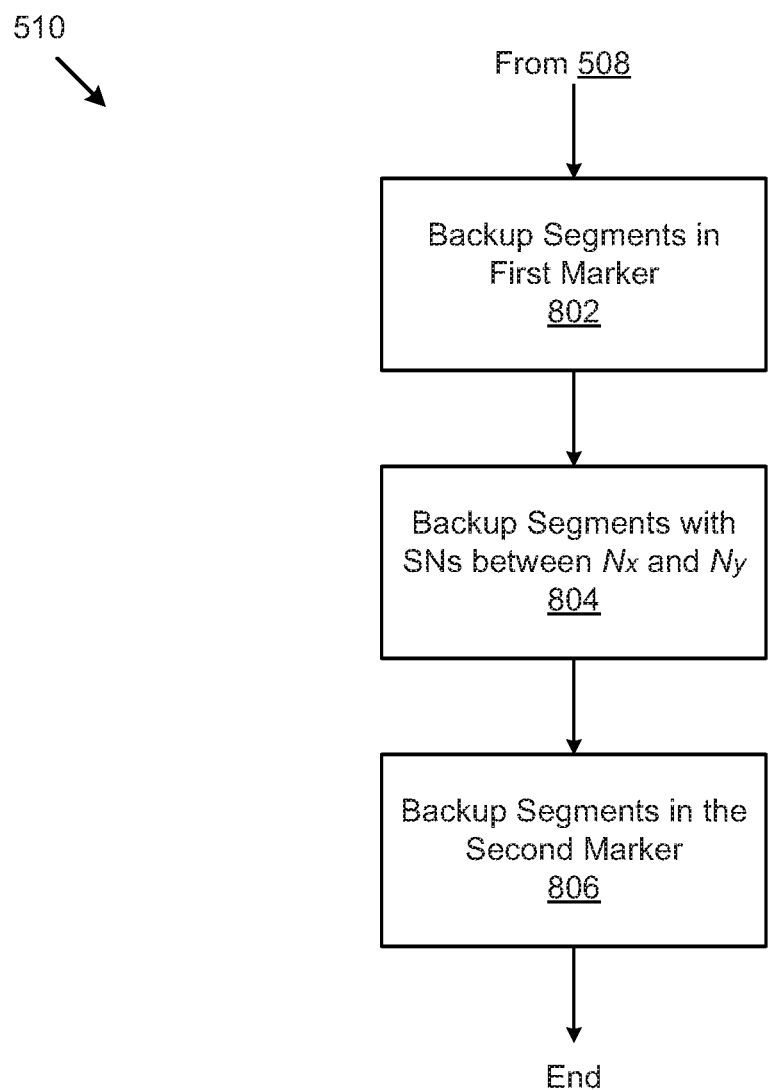
FIG. 8 is a flow chart of an example method of generating a backup and incrementally releasing a garbage collection barrier.

FIG. 8 is a flow chart of an example method of generating a backup and incrementally releasing a garbage collection barrier. In particular, the example method illustrated in FIG. 7 shows further details of generating a backup and incrementally releasing a garbage collection barrier as shown in block 510 in FIG. 5. The method corresponding to block 510 may begin, in block 802, by backing up partial segments in the first marker.

For example, with the first marker having the serial numbers 6737449, 3327114, and 465696, the segments having the serial numbers 6737449, 3327114, and 465696 would be iterated through, and each segment backed up until all of the segments have been backed up. In doing so, the garbage collection barrier may also be incrementally released during the backup of the segments as discussed further below.

In block 804, segments with serial numbers between Nx and Ny may then be backed up. Continuing with the example above, the segments with serial numbers {6737449, 6737450, 6737451 . . . 6737463} may be backed up and the garbage collection barrier incrementally released. In block 806, partial segments in the second marker may then be backed up.

Figure 9:
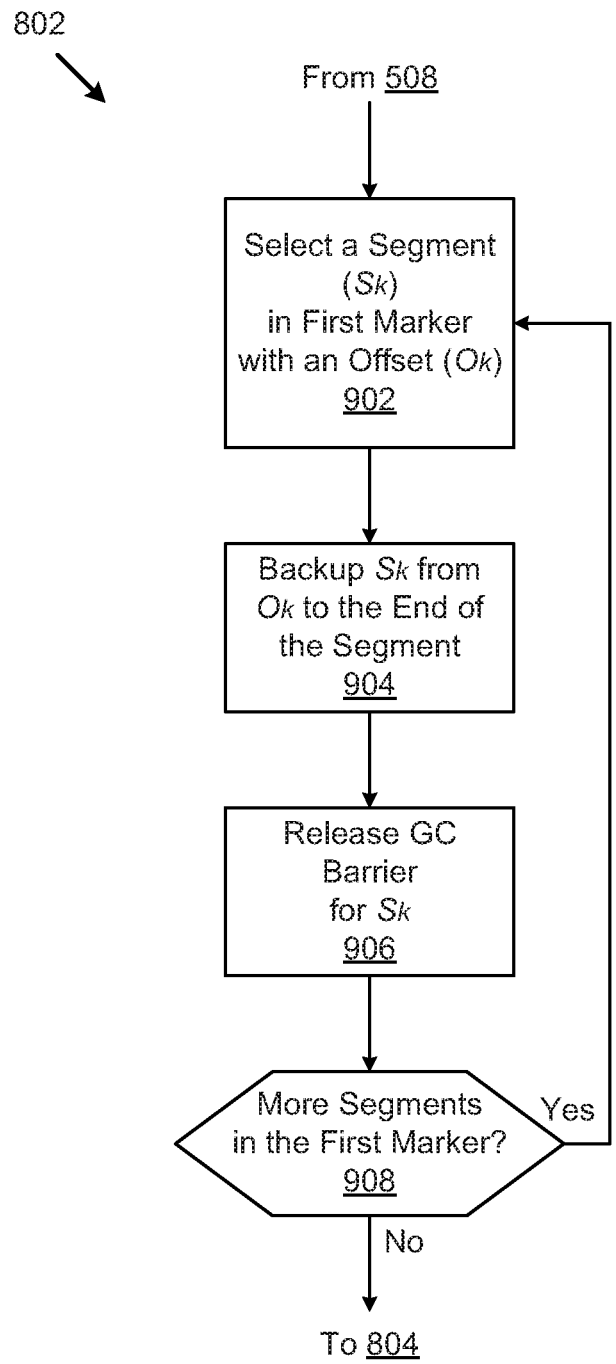
FIG. 9 is a flow chart of an example method of backing up segments in a previous marker.

FIG. 9 is a flow chart of an example method of backing up segments in a previous marker. In particular, the example method illustrated in FIG. 9 shows further details of backing up segments in the first marker as shown in block 802 in FIG. 8. The method corresponding to block 802 may begin by selecting, in block 902, a segment Sk in the first marker with an offset Ok. Since the segment may have been previously partially backed up in the previous backup, only a portion of the segment may need to be backed up. Thus, Sk may be backed up, in block 904, from Ok to the end of the segment Sk. After backing up the segment Sk in block 904, the garbage collection barrier for the segment Sk may be released, in block 906. The backup component 302 may instruct the marker operation component 304 to release the garbage collection barrier for the segment Sk. Each segment in the first marker may then be iterated through as indicated by the decision block 908. Thus, the storage logic may incrementally release the garbage collection barrier by releasing the garbage collection barrier for a segment after the segment has been backed up.

Figure 10:
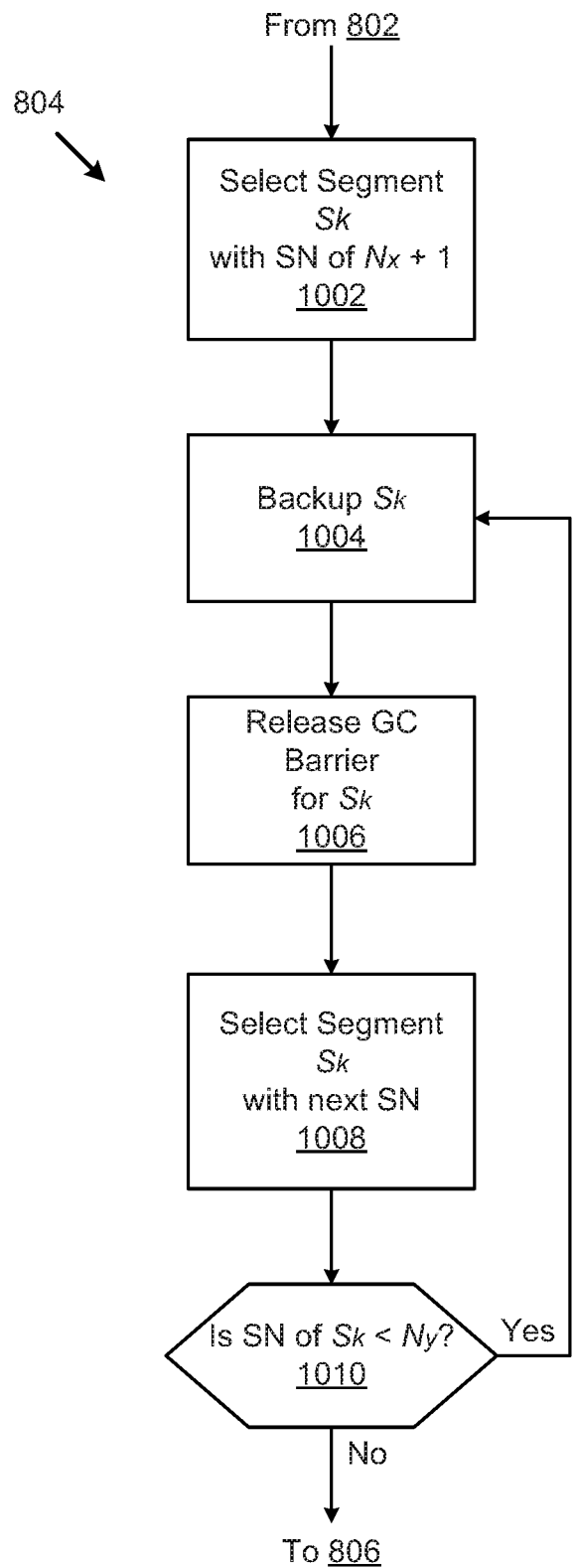
FIG. 10 is a flow chart of an example method of backing up segments with serial numbers between two calculated serial numbers.

FIG. 10 is a flow chart of an example method of backing up segments with serial numbers between two calculated serial numbers. In particular, the example method illustrated in FIG. 10 shows further details of backing up segments with serial numbers between Nx and Ny as shown in block 804 in FIG. 8. The method corresponding to block 804 may begin by selecting, in block 1002, a segment Sk with a serial number of Nx+1. Since the entire segment has been completely filled and not yet backed up, the whole segment needs to be backed up. Thus, Sk may be backed up, in block 1004, in the method corresponding to block 804. After backing up, in block 1004, the segment Sk, the garbage collection barrier for the segment Sk may be released, in block 1006. The backup component 302 may instruct the marker operation component 304 to release the garbage collection barrier for the segment Sk. Each segment in the second marker may then be iterated through as indicated by selecting, in block 1008, a segment Sk with the next serial number and determining, in block 1110, whether the serial number of Sk is less than Ny. Thus, the storage logic may incrementally release the garbage collection barrier by releasing the garbage collection barrier for a segment after the segment has been backed up.

Figure 11:
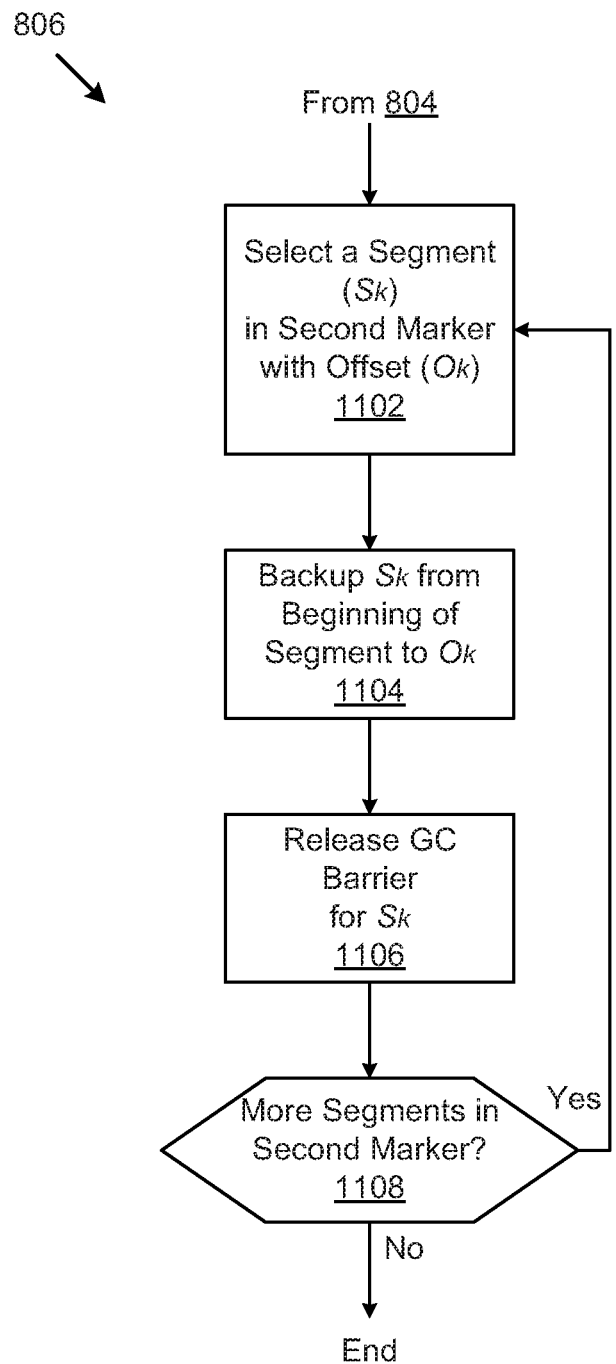
FIG. 11 is a flow chart of an example method of backing up segments associated with a current marker.

FIG. 11 is a flow chart of an example method of backing up segments associated with a current marker. In particular, the example method illustrated in FIG. 9 shows further details of backing up segments in the second marker as shown in block 806 in FIG. 8. The method corresponding to block 806 may begin by selecting, in block 1102, a segment Sk in the second marker with an offset Ok. Since the segment may not have been completely filled yet, only a portion of the segment may need to be backed up. Thus, Sk may be backed up, in block 1104, from the beginning of the segment to Ok. After backing up the segment Sk, the garbage collection barrier for the segment Sk may be released, in block 1106. The backup component 302 may instruct the marker operation component 304 to release the garbage collection barrier for the segment Sk. Each segment in the second marker may then be iterated through as indicated by the decision block 1108. Thus, the storage logic may incrementally release the garbage collection barrier by releasing the garbage collection barrier for a segment after the segment has been backed up.

Figure 12:
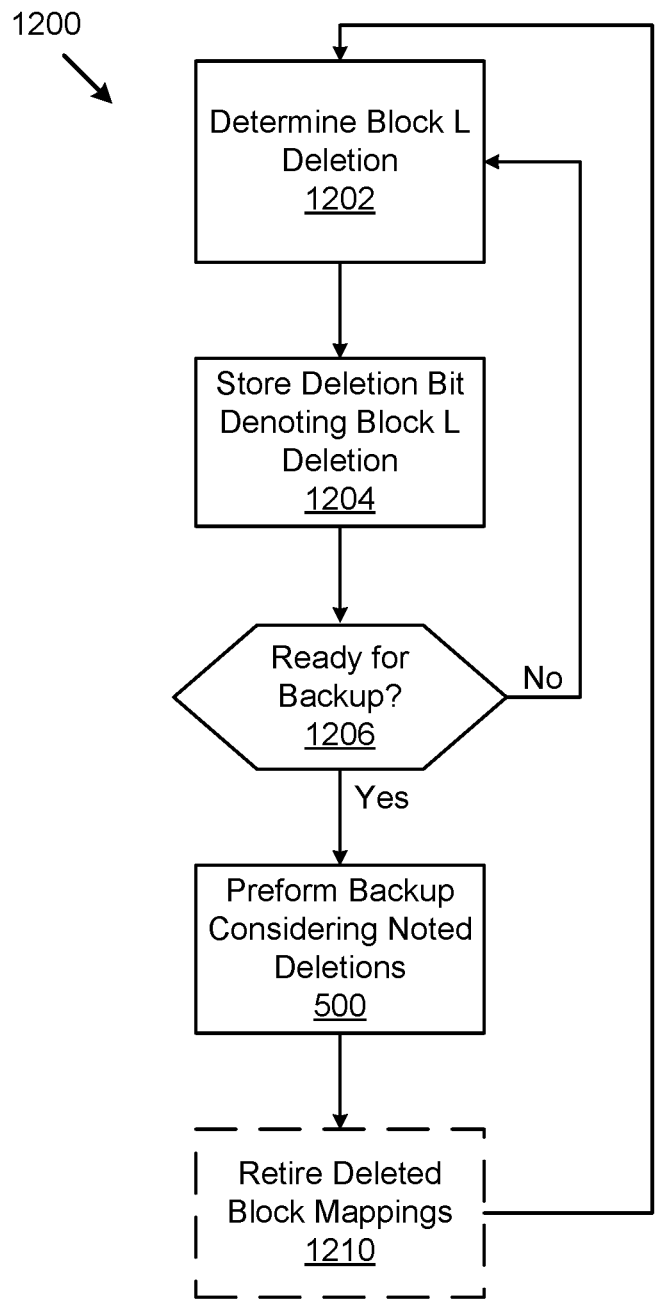
FIG. 12 is a flow chart of an example method of marker-based deletion handling.

FIG. 12 is a flow chart of an example method 1200 of marker-based deletion handling. As applications delete data from the storage devices 110, a request is sent to the storage controller 202 to effectuate the deletion. Thus the storage controller 202 may determine, in block 1202, that a block L has been deleted. In some embodiments, the storage controller may store, in block 1204, a deletion bit, denoting that the block L has been deleted, in the deletion table 210. This process continues as indicated by the decision block 1206 until a backup is ready to be performed. The backup is then performed, in block 500, while considering the noted deletions stored in the deletion table 210. In some storage system implementations, the deleted block mappings may be retired, in block 1210. For example, the deletion table may be emptied to indicate that the deleted block mappings have been retired.

The garbage collection barrier discussed above may allow overwrites to take place while the previous versions of the overwritten blocks are kept accessible for contributing to the backup. Effectively, the garbage collection barrier creates a readable view of the data set only for the duration of the backup and the storage system 100 may continue to admit freely new data. The garbage collection based solution exploits the property that the previous state of a segment, continues to be present in the system until the space it was stored in is garbage collected and reused. The garbage collection routine should defer garbage collecting the segments beyond the garbage collection barrier created by the method corresponding to block 500. As mentioned earlier, as the backup of the segments between the two markers proceeds, the restriction on not reclaiming those segments can be incrementally lifted. This incrementally lifting of the garbage collection barrier minimizes the interference caused to the garbage collection process.

Some distributed storage systems, including object storage and key-value storage systems, may employ indirection systems to map object identifiers into physical storage locations. Enhancements to such systems include consolidating the data belonging to an object so it can be accessed faster and encoding the object length into the indirection system structures.

The techniques described herein may also apply to block-based and object or file-based systems. Generally, the set of affected segments that host part or all of the objects of interest are determined. As described above, these segments may then be provided a garbage collection barrier, ordered according to update times, and enumerated to create a backup. Moreover, the techniques described herein may also extend beyond operating on an entire device or an entire storage system. For example, a storage system capacity may be divided into smaller, independent chunks like Small Computer System Interface (SCSI) Logical Unit Numbers (LUNs), Non-Volatile Memory express (NVMe) namespaces, or disk partitions.

Reference in the specification to "one embodiment", "some embodiments" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of a hardware implementation, a software implementation, or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teachings. It is intended that the scope of the present techniques and technologies not be limited by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, etc. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage system comprising:
a storage device having segments that are configured to store data; and
storage logic coupled to the storage device that manages storage of data on the storage device using a translation table that translates logical addresses to physical addresses in the storage device, wherein the storage logic is configured to:
receive a first marker as part of a backup request, wherein:
the first marker encapsulates a state of the storage device at a first time;
the first marker includes a first set of serial numbers;

the first set of serial numbers is associated with a first set of segments; and
the first marker is based on the translation table at the first time;
generate a second marker encapsulating a state of the storage device at a second time, wherein:
the second marker includes a second set of serial numbers;
the second set of serial numbers is associated with a second set of segments; and
the second marker is based on the translation table at the second time;
calculate a difference between the first marker and the second marker; and
generate a backup of data stored in the storage device based on the calculated difference between the first marker and the second marker.

2. The data storage system of claim 1, wherein the storage logic is further configured to:
determine a set of backup segments based on the calculated difference;
set a garbage collection barrier based on serial numbers associated with the set of backup segments; and
incrementally release the garbage collection barrier in association with the backup.

3. The data storage system of claim 2, wherein the storage logic is configured to incrementally release the garbage collection barrier by releasing the garbage collection barrier for each backup segment of the set of backup segments after the backup segment of the set of backup segments has been backed up.

4. The data storage system of claim 1, wherein the storage logic is further configured to generate serial numbers including the first set of serial numbers and the second set of serial numbers.

5. The data storage system of claim 1, wherein the storage logic is further configured to:
generate a marker based on the translation table; and
store the generated marker in a memory of the data storage system.

6. The data storage system of claim 1, wherein generating the second marker includes utilizing the translation table to capture the second set of serial numbers associated with the second set of segments.

7. The data storage system of claim 1, wherein the storage logic is further configured to:
determine a deletion of a storage unit from the storage device; and
record the deletion of the storage unit from the storage device in a deletion table, wherein generating the backup is further based on the deletion table.

8. The data storage system of claim 7, wherein the storage logic is further configured to retire deleted storage unit mappings in the deletion table responsive to generating the backup.

9. The data storage system of claim 1, wherein the storage logic is configured to calculate the difference between the first marker and the second marker by:
determining a first serial number, among the first set of serial numbers, having a first value;
determining a second serial number, among the second set of serial numbers, having a second value that is different from the first value; and
enumerating serial numbers between the first serial number and the second serial number.

10. The data storage system of claim 9, wherein:
the first marker includes a first set of offsets;
the second marker includes a second set of offsets; and
the storage logic is configured to generate the backup by:
backing up segments referenced in the first marker, from the offsets of the first set of offsets to an end of the segments referenced in the first marker;
backing up segments on the storage device with serial number references occurring between the first serial number and the second serial number; and
backing up segments referenced in the second marker, from a beginning of the segments referenced in the second marker to an end of the offsets of the second set of offsets.

11. The data storage system of claim 1, wherein the first marker is initialized as an empty set.

12. A method comprising:
receiving a first marker as part of a backup request, wherein:
the first marker encapsulates a state of a storage device at a first time;
the first marker includes a first set of serial numbers;
the first set of serial numbers is associated with a first set of segments;
the first marker is based on a translation table of storage logic at the first time; and
the storage logic is coupled to the storage device;
generating a second marker encapsulating a state of the storage device at a second time, wherein:
the second marker includes a second set of serial numbers;
the second set of serial numbers is associated with a second set of segments; and
the second marker is based on the translation table at the second time;
calculating a difference between the first marker and the second marker; and
generating a backup of data stored in the storage device based on the calculated difference between the first marker and the second marker.

13. The method of claim 12, further comprising:
determining a set of backup segments based on the calculated difference;
setting a garbage collection barrier based on serial numbers associated with the set of backup segments; and
releasing the garbage collection barrier incrementally in association with the backup by releasing the garbage collection barrier for each backup segment of the set of backup segments after the backup segment of the set of backup segments has been backed up.

14. The method of claim 12, further comprising:
generating a marker based on the translation table; and
storing the generated marker in a memory.

15. The method of claim 12, wherein generating the second marker comprises:
initializing the second marker;
querying the translation table for a set of segments being filled; and
adding an index, a serial number, and a fill offset of each of the segments of the set of segments being filled to the second marker.

16. The method of claim 12, further comprising:
determining a deletion of a storage unit from the storage device; and
recording the deletion of the storage unit from the storage device in a deletion table,
wherein generating the backup is further based on the deletion table.

17. The method of claim 12, wherein calculating the difference between the first marker and the second marker comprises:
determining a first serial number, among the first set of serial numbers, having a first value;
determining a second serial number, among the second set of serial numbers, having a second value that is different from the first value; and
enumerating serial numbers between the first serial number and the second serial number.

18. The method of claim 17, wherein:
the first marker includes a first set of offsets;
the second marker includes a second set of offsets; and
generating the backup comprises:
backing up segments referenced in the first marker, from the offsets of the first set of offsets to an end of the segments referenced in the first marker;
backing up segments on the storage device with serial number references occurring between the first serial number and the second serial number; and
backing up segments referenced in the second marker, from a beginning of the segments referenced in the second marker to an end of the offsets of the second set of offsets.

19. The method of claim 12, wherein the first marker is initialized as an empty set.

20. A data storage system comprising:
means for storing data having addressable segments;
means for translating logical data storage addresses to physical storage addresses;
means for receiving a first marker, wherein the first marker encapsulates a state of the means for storing data at a first time;
means for generating a second marker, wherein the second marker encapsulates a state of the means for storing data at a second time, and is based on the means for translating at the second time;
means for calculating a difference between the first marker and the second marker; and
means for generating a backup of data based on the calculated difference between the first marker and the second marker.

* * * * *